July 14, 1942. T. R. SCOTT ET AL 2,289,734
ELECTRIC POWER CABLE
Filed Jan. 7, 1939
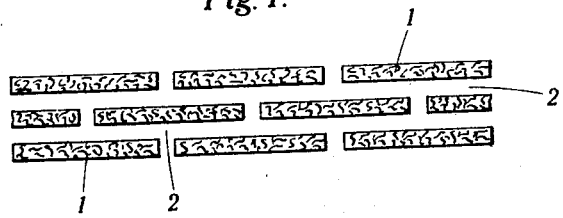
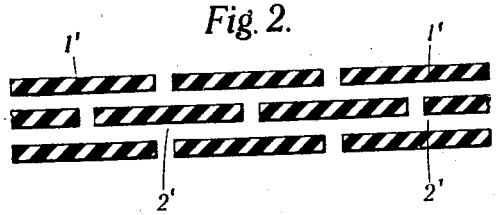
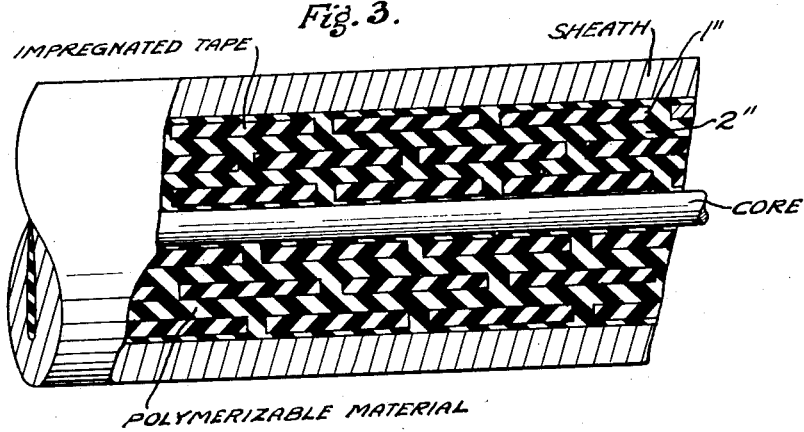
Inventors
T. R. SCOTT
J. K. WEBB
by E. D. Kinney
Attorney Patented July 14, 1942

2,289,734

UNITED STATES PATENT OFFICE 2,289,734

ELECTRIC POWER CABLE

Thomas Robertson Scott and John Krauss Webb, London, England, assignors to International Standard Electric Corporation, New York, N. Y.

Application January 7, 1939, Serial No. 249,827
In Great Britain January 11, 1938

11 Claims. (Cl. 174—121)

This invention relates to electric power cables and the present application is a continuation in part of application Serial No. 35,960, assigned to the present assignee, which was filed on August 13, 1935, and which issued July 30, 1940, as United States Patent No. 2,209,894. Generally speaking power cables are insulated with fibrous material impregnated with cable compound such as oil. The presence of free cable compound such as oil within the cable introduces difficulties due to longitudinal and radial migration of the compound for example, when an impregnated cable is laid on an incline there may be a tendency for the compound to migrate longitudinally towards the lower part of the cable with the result that pressures may be set up leading to distention and possibly to fracture of the lead sheath, while voids may be left in the upper part of the cable leading to ionisation and possibly to breakdown of the insulation. Another difficulty is caused by heating and cooling of the cable in operation which leads to radial expansion and contraction of the cable compound which may in time cause distention of the sheath leaving a space between the insulation and the sheath into which the compound may collect leaving voids in the insulation.

We have already attempted to overcome these migration difficulties by the application of polymerisable material such as styrene to cables, for example in British Patent No. 460,031 we describe the preparation in a cable of a solid plug in the formation of which the cable compound is substantially replaced by polymerisable material applied to the cable through tappings in the cable sheath and thereafter polymerised "in situ" to complete the plug. Also in United States Patent No. 2,209,894 we set forth methods of terminating cables in order to prevent transfer of the compound in and out of the end of the cable end, one method being to impregnate a length of tail cable with polymerised material such as polystyrene and then to joint this tail cable to the main length of cable.

Hitherto however, we have encountered difficulties in the impregnation with monomeric material due to the fact that we had no certain means of knowing when the impregnant would polymerise. One difficulty was caused by the impregnant polymerising during the time it was being fed into the cable with the result that the nipples through which feeding was being carried on tended to become blocked and faulty impregnation resulted. Another difficulty as pointed out in United States Patent No. 2,209,894 is that a length of cable impregnated with polystyrene is inflexible and brittle so that hitherto if the impregnation was carried out in the factory it was generally speaking necessary to limit the impregnated cable length to a short length of cable which could be handled in an inflexible condition should polymerisation take place before installation.

It is well known in the art that methods of stabilising polymerisable materials against polymerisation are available but these methods are not always equally effective and there is no means of controlling the stabilisation obtained, further special treatments are required in order to permit polymerisation to take place when required. These special treatments cannot in general be effected without removal of the stabilised monomer from the cable which thereafter has to be reimpregnated with the destabilised monomer. Further, if the initial impregnation (or even during the reimpregnation) is effected in the field using non-stabilised monomer there are dangers of faulty impregnation arising from polymerisation around the nipples during the impregnation due to heating or to the polymerisable picking up impurities of an accelerating nature.

In view of the above difficulties we have made experiments in order to provide satisfactory methods of stabilisation and as a result we have now been able to eliminate the above difficulties by the provision of a range of stabilisers whose stabilising action may be controlled in such a manner that an amount of stabilizer is added to the monomeric or partially polymerised material determined by the temperature to which the monomeric material is to be subjected and by the length of the period of stabilisation required. The question of the stabilisation of styrene is considered in detail in British Patent No. 504,765. As a result of our experiments it has been found that the action of a stabilising agent upon styrene is not such as to prevent indefinitely the polymerisation of styrene. We have discovered that, on the contrary a stabilizing agent that acts as an inhibitor of polymerisation increases the natural short period during which no substantial polymerisation takes place, which period may be called an induction period. Thus by the addition of a stabilising agent that acts as an inhibitor the natural short time induction period of styrene at normal temperatures may be prolonged and/or an extended induction period may be caused to occur at temperatures at which it would otherwise be inappreciable. We have found therefore that styrene may be stabilised by adding thereto a percentage of a stabiliser dependent upon the length of the period during which polymerisation is required to be prevented and upon the temperature to which the styrene is to be subjected.

The following table shows the lengths of the induction period of styrene caused by various stabilisers of the percentage given:

| Stabiliser | Added | Induction period at— | |
|---|---|---|---|
| | | 60° C. | 120° C. |
| | Per cent | | |
| Benzoquinone | .01 | 3 days | 15 minutes. |
| Do | .05 | 2 weeks | 70 minutes. |
| Do | .2 | 2 months | 4½ hours. |
| Catechol | .5 | 170 hours | Less than ½ hour. |
| Chloranil* | .2 | 6 weeks | 180 minutes. |
| 1.aminoazthraquinone | .2 | 110 hours | About ½ hour. |
| Toluquinone | .2 | 2 months | 270 minutes. |
| Phenyl 1.napthylamine | .5 | 150 hours | Less than ½ hour. |
| Phenyl 2.napthylamine | .5 | do | Do. |
| Methylaniline | .5 | 40 hours | Do. |
| 2.4 diaminoazobenzene | .5 | 150 hours | Do. |
| Acenapthenequinone | .5 | 220 hours | Less than 20 minutes. |
| Hydroquinone | .5 | 170 hours | Do. |
| P-phenylenediamine | .5 | 150 hours | 20 minutes. |
| Metol* | .5 | 110 hours | Less than 10 minutes. |
| Hexamine* | .5 | 30 hours | Do. |
| Hydroxylamine hydrochloride.* | .5 | 50 hours | Do. |
| Resorcinol* | .5 | 30 hours | Do. |
| O.nitro p.cresol | .5 | 400 hours | Less than ½ hour. |
| 1.5 dinitroanthraquinone | .5 | 350 hours | Do. |
| P.nitrosodimethylaniline | .2 | 7 weeks | 230 minutes. |
| Styrene (for comparison) | | 10 hours | 5 minutes. |

It may be noted that in the case of those substances marked * the times given at 60° refer to measurements made with an excess of the inhibitor present due to the fact that the substances are not soluble in styrene up to .5%, whereas in the case of the times given at 120° C. the measurements relate to saturated solutions of the inhibitor in styrene with no excess e. g. concentrations of less than .2% of the inhibitor.

The principal use of the above stabilisers is to prevent or substantially prevent any polymerisation of styrene at room temperature. The induction period for each of the above substances is given at 60° C. instead of at room temperature because of the length of time that would be necessary to verify the length of the induction period at room temperature, since such induction period may run into years.

It may be noted that certain of the stabilisers such as hydroquinone are only sparingly soluble in the stryene, and therefore, according to British Patent No. 504,765 in order to enable this stabiliser to be used for long periods of stabilisation an excess of the hydroquinone may be added to the styrene and any excess remaining may be removed by filtration when it is desired to effect polymerisation. Obviously, however, this is not possible in accordance with this invention and therefore stabilisers such as hydroquinone can only be employed in cases where a short period of stabilisation is required at low temperatures. The stabiliser to be employed must therefore be chosen with regard to the conditions to which the styrene is to be subjected. It may be desirable to carry out polymerisation at temperatures not in excess of the final working temperature of the cable e. g. 75° C. and therefore stabilisers such as acenapthlenequinone, methylaniline or hexamine which possess relatively short induction periods at the temperature of polymerisation may preferably be employed.

In general a stabiliser to be employed in the present invention should have the following features, viz. should be (a) Capable of being controlled as regards the length of the induction period produced.

(b) Sufficiently soluble in the monomer to maintain the stability for a desired period of time without the presence of excess not in solution and (c) The reactive component formed between the monomer and the stabiliser should not be detrimental to the finished cable and (d) The stabilising effect should be capable of being removed by heat when desired.

It will therefore be understood from the above that it is now possible to exercise a considerable degree of control over the stabilisation and that the technique for the impregnation of cables with stabilised monomeric or partially polymerised material may be worked out for various cable designs and problems. Therefore in accordance with the present invention we provide an electric power cable insulated with lappings of tape impregnated with an insulating medium comprising polymerised material applied to the cable in liquid form as stabilised monomeric material or stabilised partially polymerised material which is thereafter allowed to polymerise or is destabilised, as by heating or filtration to remove excess stabiliser, and polymerised at a convenient time.

The importance of the present invention in overcoming the difficulties mentioned above will be readily appreciated. Difficulties due to polymerisation of the material around the nipples may be overcome by stabilising the polymerisable material for a sufficient length of time to enable the completion of the impregnation to be effected. In this way plugs in existing cable installations may be produced by feeding in stabilised monomeric material. Impregnation of cables with stabilised monomeric material may also be effected in the factory without fear of trouble due to the polymerisable material turning solid prior to installation of the cable in view of the fact that the polymerisable material may be stabilised for a considerable period of time under the control of the cable engineers.

It will be understood therefore that when impregnation is effected upon an installed cable or in special cases in which the impregnant comprises a sufficiently small quantity of polymerisable material to produce a flexible cable even after polymerisation it is sufficient to stabilise the polymerisable material against polymerisation during the impregnating process. An impregnating compound may for example, comprise a mixture of polymerisable material and oil so blended that after polymerisation a material is produced that does not readily flow but on the other hand is sufficiently flexible to permit of polymerisation in the factory. As the percentage of polymerisable material is increased the flexibility of the finished cable is diminished and the difficulty of installation is increased. It must however, be remembered that even in the special cases referred to above in which polymerisation of small quantities of polymerisable material may by effected within the cable in the factory without reducing the flexibility of the cable to a point at which installation difficulties are experienced, trouble may arise during the application of the polymerisable material to the cable, unless stabilisation is effected, due to blocking of the nipples.

In cases in which impregnation is carried out in the factory with an insulating medium containing polymerisable material which when polymerised produces an inflexible cable it is necessary to stabilise for a sufficiently long period to enable installation to be carried out before the polymerisation has rendered the cable inflexible.

It will be understood from the above that an object of the invention is to mitigate difficulties due to migration of a free compound within the cable and in order to achieve this object in accordance with the invention several alternatives are available for example, an entire cable length may be impregnated with an insulating medium containing polymerisable material which when polymerised turns the medium substantially solid and inflexible, alternatively only sufficient polymerisable material may be employed to produce a thickened medium that does not readily migrate. Another method of carrying the invention into effect is to provide a number of plugs spaced apart at intervals along the length of the cable, the plugs being provided by applying an insulating medium containing a polymerisable material stabilised against polymerisation for a required period.

It may here be explained that while the figures for the stabilisers given in the above table refer to experiments made with styrene it is believed that the figures will be approximately the same for other aromatic mono-olefines. On the other hand it must be expected that the results obtained in connection with other monomeric materials such as for example, derivates of acrylic acid will give figures differing somewhat from the above results. This is, however, not important in that the length of the induction period in any particular case may very readily be obtained by a simple experiment and an amount of the stabiliser may then be added to give the required period of stability. In this way the difficulties hitherto encountered in the impregnation of cables with polymerisable materials may be overcome.

On the other hand the term "polymerisable material" employed in this specification is intended to include only those polymerisable materials suitable for use in achieving the object of the invention namely overcoming difficulties due to the presence of free compound within the cable. A polymerisable material should therefore be liquid under normal atmospheric conditions or should be capable of forming a liquid insulating medium when blended with another impregnant such as oil and should be capable of polymerisation to form a solid or viscous polymer which does not readily flow and has satisfactory dielectric loss properties. The dielectric loss that can be tolerated will obviously depend upon the cable in question but the electrical properties of the polymer should be such that it does not form a source of electrical weakness in the cable.

Among polymerisable materials that may be employed styrene may be mentioned as being the preferable substance in view of its very satisfactory electrical properties. The styrene may be plasticised in accordance with British Patent No. 490,814 or may be admixed with rubber with or without the addition of a rubber plasticiser. If desired the styrene or other aromatic monoolefine may be admixed with polyisobutylene or other like polymer. Among other polymers that may be mentioned are further vinyl compounds such as polyvinyl chloride or polyvinyl acetate.

In order that the underlying idea of the invention may be clearly understood reference is directed to the accompanying drawing included by way of example.

In the drawing Fig. 1 illustrates diagrammatically lappings of fibrous material forming part of the insulation of a normal mass impregnated power cable, the reference numeral 1 indicating the fibrous material e. g. paper, while the reference 2 indicates the spaces between adjacent lappings and between adjacent convolutions (these spaces are of course rather exaggerated). The whole of the insulation is thoroughly permeated by free cable compound which fills the spaces 2 and in addition the fibrous material 1 is thoroughly impregnated in or soaked with the compound. Fig. 2 shows a cable embodying the invention set forth in British Patent No. 508,034 in which the reference numeral 1' indicates fibrous material impregnated with polymerised material which does not absorb the cable compound to any great extent, the cable compound being retained within the spaces 2'. To this end the impregnant may be polymerized isobutylene and the cable compound may be styrene. In this way a reduction of as much as 60% of the compound may be effected. Fig. 3 is a partly sectionalized elevation of a cable and shows by way of example a construction of cable according to the present invention in which 1" indicates lappings of fibrous material which may be impregnated with any desired normal compound (e. g. oil), jelly, halowax or the like or may be impregnated with polymerised material and 2" indicates the spaces between the lappings or convolutions of fibrous material, which spaces 2" are filled with an insulating medium comprising polymerised material applied to the cable as a stabilised monomeric or partially polymerised material and thereafter polymerised or allowed to polymerise "in situ" within the cable at a convenient time.

It is believed from the above general description that the underlying idea of the invention will be clearly understood and it is now therefore proposed to refer in greater detail to several cable designs embodying the present invention.

1. A cable comprising a conductor or conductors lapped with pre-impregnated papers (e. g. oil, jelly, halowax or the like) but substantially devoid of free cable compound (e. g. substantially without cable compound in the interstices between the lappings or in between the conductor strands) may be impregnated with stabilised styrene either in the factory or after installation of the cable, the stabilised styrene after installation being polymerised or allowed to polymerise to give a plastic mixture of the original impregnant of the paper and polystyrene (preferably suitably plasticised). According to this embodiment of the invention a cable of increased dielectric breakdown strength is provided without at the same time introducing migration problems arising from the cable impregnated as explained above.

2. A cable may be built up with unimpregnated paper insulation and thereafter dried, lead sheathed, impregnated in accordance with the technique described in British Patent No.379,704 with stabilised styrene, then waterproofed and installed. Thereafter the monomeric styrene may be polymerised.

3. A cable similar to the cable described in clause (2) may be constructed, and after installation, but prior to polymerisation, the monomeric styrene may be driven out of the annular space between insulation and the lead sheath and/or the interstices of the strand by nitrogen or other suitable gas. Gas pressure may be maintained during polymerisation and thereafter during service in order to keep the polymeric styrene compressed and free from voids. This process is limited to cables having a conducting screen round each insulated core, in view of the fact that it is not desirable to have the gas under electric stress. The longitudinal hydraulic resistance of the lapped insulation of the cable within the conducting screen is sufficiently high to resist displacement of the impregnant therein e. g. monomeric styrene by the gas.

4. A cable such as that described in clause (3) may be constructed with an extruded layer over the stranded conductor the layer being a good conductor (e. g. lead) or a good insulator (e. g. styrene) with the gas pressure introduced in the annular space between insulation and outer lead sheath.

5. A cable such as that described in clause (3) may be constructed with an extruded plastic layer (preferably of polymeric material e. g. polyisobutylene blended with styrene or the like) over the insulation of each core so that the impregnant (e. g. monomeric styrene) is confined within the fibrous insulation and the annular space between extruded layer and the lead sheath is reserved, free of liquid, for the gas pressure.

6. Cores of types described in clauses (3), (4) and (5) may be suitably sheathed and may be used in cables according to British Patent No. 479,883 i. e. surrounded by further fibrous insulation which may itself be impregnated with monomeric or by extruded insulation subjected to a radial pressure from the inner surface thereof due to the gas pressure acting from within the sheath or sheaths of the said cores. When more than one core is used the conductors of the said cores may be connected in parallel in one phase to produce grading of the electrical stress according to the technique described in British Patent No. 461,677.

7. A cable impregnated with compound in the normal way may after sheathing (before or after installation) have monomeric styrene introduced in place of the compound in the strand and annular space between the insulation and the lead sheath. This styrene will to some extent diffuse throughout the compound and raise the viscosity thereof when polymerisation is effected. This is not an undesirable feature. The polymerisation of the main body of monomeric styrene in the strand and the annular space between lead sheath and insulation will reduce to a negligible value migration of compound.

8. A special case of the cable described in clause (7) is the pressure feeding of ordinary cables in service with monomeric styrene after the manner adopted in the United States of America for pressure feeding at joints with thin oil to fill up voids caused by expansion of the lead sheath on heat cycles. Feeding with thin oil causes cumulative distension of the lead sheath with finally bursting of the sheath. Feeding with stabilised monomeric styrene which is eventually polymerised will lead to cessation of feeding after a desired amount of filling has been effected.

9. Obviously the invention may be used in connection with British Patent No. 461,677 as mentioned above, for example, in the multi-core case in which the cores are connected in parallel in one phase the part of the cable within the innermost intersheath may be impregnated with monomer e. g. styrene subsequently polymerised. The innermost intersheath may be made of lead or may be metallised paper tape surrounded by an extruded layer of insulating material and the insulation between the extruded layer which may be bounded on its outer surface by a second conducting intersheath and the outer sheath of the cable which is at earth potential may consist of paper tape impregnated with polymer prior to application to the cable, the whole of the said outer belt of insulation being maintained under gas pressure e. g. in accordance with the technique set forth in British Patent No. 494,694.

In all cases it is assumed that the monomeric styrene is suitably stabilised before introduction into the cable and that a suitable quantity of a selected plasticiser may be added together with, if desired, some ordinary insulating compound such as oil.

In the case of multicore cables it is recognised that the filler spaces present paths of fluid resistance of an order equivalent to those presented by the strand so that the styrene or compound in the filler spaces behaves in a manner similar to the strand (or the annular space between insulation and outer lead sheath) in the processes described.

It will be understood that the invention also includes a method of manufacturing and installing a power cable comprising building up the cable insulation, applying a metallic sheath therearound, impregnating the insulation with stabilised monomer before or after installation of the cable and thereafter polymerising the monomer after installation, the underlying idea behind the invention being therefore to impregnate the insulation of cable with liquid stabilised polymerisable material which is thereafter polymerised, as by heating to drive off the stabilizer, or allowed to polymerise in order to produce a cable of high insulation electrical breakdown strength and in which troubles arising from free liquid within the cable are overcome, or at least minimized, due to the fact that the spaces, voids, and so on within the cable are filled with a preferably plasticised polymer or a jelly-like substance comprising cable compound, such as oil admixed with polymer.

What is claimed is:

1. An electric cable comprising a conductor insulated with lappings of insulating tape comprising polymerized material, the spaces between the adjacent lappings being filled with stabilized polymerizable material, the polymerized material within said tapes being substantially insoluble in the stabilized polymerizable material.

2. An electric power cable according to claim 1 characterised in this that the tapes comprise polymerised isobutylene and that stabilised styrene is employed to fill the spaces between the tapes.

3. A method of manufacturing and installing an electric cable which comprises lapping a conductor with fibrous tapes, applying a flexible, fluid-tight, protective sheath around the lapped conductor, feeding into the space within the sheath polymerizable material stabilized for a predetermined period against polymerization, thereafter installing the cable in position for use and thereafter polymerizing said polymerizable material.

4. A method in accordance with claim 3 wherein said fibrous tapes are first impregnated with normal cable compound before being applied to said conductor.

5. A method in accordance with claim 3 wherein said fibrous tapes are first impregnated with normal cable compound and wherein after the application of said protective sheath a part of said oil cable compound is displaced by the introduction under pressure of the said polymerizable material.

6. A method in accordance with claim 3 wherein a conducting screen is placed around the lapped conductor and after the cable is installed in position for use the polymerizable material is driven out of the space between the lapped conductor and the sheath by gas pressure and said gas pressure is maintained during polymerization to keep the polymeric material compressed and free from voids.

7. A method of manufacturing and installing an electric cable which comprises extruding a protective layer over a stranded conductor, lapping said layer with fibrous tapes, applying a flexible, fluid-tight protective sheath around the lapped conductor, feeding into the space within the sheath polymerizable material stabilized for a predetermined period against polymerization, thereafter installing the cable in position for use and thereafter applying gas pressure to drive out the polymerizable material from the space between the lapped conductor and the sheath and polymerizing the remaining polymerizable material while maintaining said gas pressure to keep the polymeric material compressed and free from voids.

8. A method of manufacturing and installing an electric cable which comprises lapping a conductor with fibrous tapes, impregnating said tapes with polymerizable material stabilized against polymerization, extruding a plastic layer of polymerized material over the lapped conductor, applying a flexible, fluid-tight, protective sheath around the said plastic layer, thereafter installing said cable in position for use, then applying gas pressure between said sheath and said layer and polymerizing said polymerizable material while maintaining said gas pressure.

9. A method in accordance with claim 3 which comprises blowing the polymerizable material out of the conductor strand by gas under pressure prior to polymerization of the remaining polymerizable material.

10. A method in accordance with claim 3 which comprises blowing the polymerizable material out of the space between the sheath and the insulation by gas under pressure prior to polymerization of the remaining polymerizable material.

11. A method according to claim 3, characterized in this, that the polymerizable material is destabilized by heat shortly before installation of the cable.

THOMAS ROBERTSON SCOTT.
JOHN KRAUSS WEBB.